(12) United States Patent
Xiong et al.

(10) Patent No.: US 10,110,537 B2
(45) Date of Patent: Oct. 23, 2018

(54) METHOD AND DEVICE FOR NOTIFYING INFORMATION OF SOCIAL CLIENT

(71) Applicant: TENCENT TECHNOLOGY (SHENZHEN) COMPANY LIMITED, Shenzhen, Guangdong (CN)

(72) Inventors: Huan Xiong, Shenzhen (CN); Minghong Tang, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 744 days.

(21) Appl. No.: 14/262,473

(22) Filed: Apr. 25, 2014

(65) Prior Publication Data

US 2014/0244771 A1   Aug. 28, 2014

Related U.S. Application Data

(63) Continuation of application No. PCT/CN2013/072092, filed on Mar. 1, 2013.

(30) Foreign Application Priority Data

Mar. 1, 2012 (CN) .......................... 2012 1 0052278

(51) Int. Cl.
*G06F 15/16* (2006.01)
*H04L 12/58* (2006.01)
(Continued)

(52) U.S. Cl.
CPC .......... *H04L 51/24* (2013.01); *G06F 17/3089* (2013.01); *G06F 17/30867* (2013.01); *G06Q 50/01* (2013.01)

(58) Field of Classification Search
CPC .................. G06F 17/30869; G06F 17/3089
(Continued)

(56) References Cited

U.S. PATENT DOCUMENTS 6,970,926 B1   11/2005   Needham et al.
7,127,522 B1   10/2006   Nakamura et al.
(Continued)

FOREIGN PATENT DOCUMENTS

CN   1239791 A   12/1999
CN   1976333 A   6/2007
(Continued)

OTHER PUBLICATIONS

International Search Report in international application No. PCT/CN2013/072092, dated Jun. 6, 2013. (2 pages—see entire document).

(Continued)

*Primary Examiner* — Karen Tang
(74) *Attorney, Agent, or Firm* — Sughrue Mion, PLLC

(57) ABSTRACT

The present disclosure provides a method and a device for notifying information of a social client. The method comprises: updating information of the social client; extracting information of a client contained in an associated client list of the social client identified as a specified category, and notifying the updated information of the social client to the specified category of client; and filtering out the information of the client contained in the associated client list of the social client identified as the specified category, and notifying the updated information of the social client to the rest of clients contained in the associated client list. The present disclosure ensures some specified categories of associated clients of a social client can be notified of information, thereby enabling effective synchronization of information of the social client and improving the information processing efficiency of the social client.

6 Claims, 2 Drawing Sheets

(51) Int. Cl.
*G06F 17/30* (2006.01)
*G06Q 50/00* (2012.01)

(58) Field of Classification Search
USPC .................................................. 709/204, 207
See application file for complete search history.

(56) References Cited

U.S. PATENT DOCUMENTS

| | | | | |
|---|---|---|---|---|
| 9,198,153 | B2* | 11/2015 | Kraufvelin | H04W 64/00 |
| 2002/0156844 | A1* | 10/2002 | Maehiro | H04L 29/06 |
| | | | | 709/203 |
| 2003/0130894 | A1* | 7/2003 | Huettner | G06Q 30/0257 |
| | | | | 705/14.55 |
| 2004/0058710 | A1* | 3/2004 | Timmins | H04M 3/4931 |
| | | | | 455/560 |
| 2006/0168628 | A1* | 7/2006 | Ogawa | G06Q 30/02 |
| | | | | 725/80 |
| 2006/0173985 | A1* | 8/2006 | Moore | G06F 17/3089 |
| | | | | 709/223 |
| 2006/0184617 | A1* | 8/2006 | Nicholas | G06Q 30/02 |
| | | | | 709/203 |
| 2007/0112918 | A1 | 5/2007 | Berstis | |
| 2009/0016510 | A1 | 1/2009 | Becker | |
| 2009/0076887 | A1* | 3/2009 | Spivack | G06Q 30/02 |
| | | | | 705/14.69 |
| 2009/0150400 | A1* | 6/2009 | Abu-Hakima | G06F 17/30864 |
| 2009/0156160 | A1* | 6/2009 | Evans | G06Q 50/01 |
| | | | | 455/404.2 |
| 2009/0177754 | A1* | 7/2009 | Brezina | G06Q 10/107 |
| | | | | 709/206 |
| 2009/0222525 | A1 | 9/2009 | Jayawant Pattan | |
| 2009/0327419 | A1* | 12/2009 | Serr | G06F 15/16 |
| | | | | 709/204 |
| 2010/0257412 | A1* | 10/2010 | Acuna | G06F 11/0727 |
| | | | | 714/54 |
| 2011/0161442 | A1* | 6/2011 | Bouazizi | H04H 20/93 |
| | | | | 709/206 |
| 2011/0212430 | A1* | 9/2011 | Smithmier | G09B 5/06 |
| | | | | 434/322 |
| 2012/0010955 | A1* | 1/2012 | Ramer | G06Q 30/02 |
| | | | | 705/14.46 |
| 2012/0131139 | A1* | 5/2012 | Siripurapu | H04L 65/60 |
| | | | | 709/217 |
| 2012/0300698 | A1* | 11/2012 | Lindner | H04W 4/08 |
| | | | | 370/328 |
| 2012/0303431 | A1* | 11/2012 | Phillips | G06Q 30/02 |
| | | | | 705/14.22 |
| 2013/0061179 | A1* | 3/2013 | Alletto | G06Q 40/00 |
| | | | | 715/843 |
| 2013/0232158 | A1* | 9/2013 | Heggelund | G06F 17/30345 |
| | | | | 707/756 |
| 2013/0311572 | A1* | 11/2013 | Faller | H04L 65/403 |
| | | | | 709/204 |
| 2014/0304714 | A1* | 10/2014 | Shapiro | G06F 9/542 |
| | | | | 719/318 |
| 2017/0171124 | A1* | 6/2017 | Brezina | H04L 51/08 |
| 2018/0060293 | A1* | 3/2018 | Agrawal | G06F 3/0483 |

FOREIGN PATENT DOCUMENTS

| | | |
|---|---|---|
| CN | 101179407 A | 5/2008 |
| CN | 101399781 A | 4/2009 |
| CN | 101547411 A | 9/2009 |
| CN | 102176705 A | 9/2011 |
| WO | 2007061251 A1 | 5/2007 |

OTHER PUBLICATIONS

English Translation of the Written Opinion of the International Search Authority in international application No. PCT/CN2013/072092, dated Jun. 6, 2013. (15 pages—see entire document).
Notification of the First Office Action of Chinese application No. 201210052278.4, dated Nov. 23, 2016.

* cited by examiner

METHOD AND DEVICE FOR NOTIFYING INFORMATION OF SOCIAL CLIENT

CROSS REFERENCE TO RELATED APPLICATIONS

This is a continuation application of International Patent Application No. PCT/CN2013/072092, filed on Mar. 1, 2013, which claims priority to Chinese Patent Application No. 201210052278.4 filed on Mar. 1, 2012, the disclosure of which is incorporated by reference herein in its entirety.

TECHNICAL FIELD

The present disclosure relates to the field of network communication technology, and in particular, to a method and a device for notifying information of a social client.

BACKGROUND

With the continuous development of Instant Messenger (IM) technology, the IM technology becomes one indispensable tool for users in daily life. IM software mainly implements one-on-one chat mode or one-on-many chat mode. With the continuous development of Internet application, microblog, as a new product for extending the IM message propagation mechanism, has been widely used in a short period.

When profile information of a social client, such as the number of posted messages, is updated, it is necessary to notify the associated clients of this social client synchronously. Generally, the way to notify the number of messages posted by a social client is to add, when this social client posts a message or forwards a message, the message count of this social client is increased by 1, and then pull an associated client list of this social client (the information of 40,000 associated clients can be pulled at most based on the reverse order of join time) and notify these associated clients of the latest message count of this social client.

However, since some social clients (for example, the social client of celebrities) have a great number of associated clients (for example, in tens of thousands, which is far greater than 40,000) and the associated client list is pulled based on the reverse order of join time of the associated clients, the notified associated clients generally are newly joined associated clients; for those associated clients joined in earlier time (for example, the social clients of the people knowing the celebrity for a long time generally join in the celebrity's social client in an earlier time), they can not be notified. As a result, the information of the social client can not be synchronized effectively and an information processing inefficiency of the social client is caused.

SUMMARY

The present disclosure provides a method and a device for notifying information of a social client, so that the information of the social client can be effectively synchronized.

The technical solution of the present disclosure is realized as follows.

The present disclosure provides a method for notifying information of a social client, including:
updating information of the social client;
extracting information of a client contained in an associated client list of the social client identified as a specified category, and notifying the updated information of the social client to the specified category of client; and
filtering out the information of the client contained in the associated client list of the social client identified as the specified category, and notifying the updated information of the social client to the rest of clients contained in the associated client list.

In the solution above, extracting the information of a client contained in the associated client list of the social client identified as a specified category and notifying the updated information of the social client to the specified category of client may include:
acquiring information of each of the associated clients of the social client identified as the specified category, establishing the associated client list of the specified category, and notifying the updated information of the social client to the specified category of client according to the associated client list of the specified category.

In the solution above, before extracting the information of a client contained in the associated client list of the social client identified as a specified category, the method further includes: validating whether the social client is a client of the specified category;
if so, extracting the information of the client contained in the associated client list of the social client identified as the specified category.

In the solution above, the method further includes: if the social client is not a client of the specified client, notifying the updated information of the social client to the associated clients contained in the associated client list.

In the solution above, notifying the updated information of the social client to the associated clients contained in the associated client list includes: notifying the updated information of the social client to part or all of the associated clients contained in the associated client list.

The present disclosure also provides a computer program product, including instructions for enabling a processor to implement the steps described in the above methods when the instructions are executed on the processor.

The embodiment of the present disclosure also provides a computer readable medium, including the computer program product described above.

The present disclosure also provides a device for notifying information of a social client, including:
an update unit, configured to update the information of the social client and to trigger a notification unit;
the notification unit, configured to extract information of a client contained in an associated client list of the social client identified as a specified category and to notify the updated information of the social client to the specified category of client, and to filter out the information of the client contained in the associated client list of the social client identified as the specified category and to notify the updated information of the social client to the rest of clients contained in the associated client list.

In the solution above, the notification unit is specifically configured to acquire information of each of the associated clients of the social client identified as the specified category, to establish the associated client list of the specified category and to notify the updated information of the social client to the specified category of client according to the associated client list of the specified category.

In the solution above, the device further includes: a validation unit, configured to validate whether the social client is a client of the specified category;
the notification unit is specifically configured to extract the information of the client contained in the associated client list of the social client identified as the specified category when the validation unit validates that the social client is a client of the specified category.

In the solution above, the notification unit is further configured to notify the updated information of the social client to the associated clients contained in the associated client list when the validation unit validates that the social client is not a client of the specified category.

In the solution above, the notification unit is configured to notify the updated information of the social client to part or all of the associated clients contained in the associated client list.

The present disclosure also provides a server, including: a notification unit, wherein the notification unit is configured to: when information of a social client is updated, extract information of a client contained in an associated client list of the social client identified as a specified category and notify the updated information of the social client to the specified category of client; filter out the information of the client contained in the associated client list of the social client identified as the specified category and notify the updated information of the social client to the rest of clients contained in the associated client list.

In the solution above, the notification unit is specifically configured to acquire information of each of the associated clients of the social client identified as the specified category, to establish the associated client list of the specified category and to notify the updated information of the social client to the specified category of client according to the associated client list of the specified category.

In the solution above, the server further includes: a validation unit, which is configured to validate whether the social client is a client of the specified category;

the notification unit is specifically configured to extract the information of the client contained in the associated client list of the social client identified as the specified category when the validation unit validates that the social client is a client of the specified category.

In the solution above, the notification unit is further configured to notify the updated information of the social client to the associated clients contained in the associated client list when the validation unit validates that the social client is not a client of the specified category.

In the solution above, the notification unit is configured to notify the updated information of the social client to part or all of the associated clients contained in the associated client list.

With the method and the device provided by the present disclosure for notifying information of a social client, when the information of the social client is updated, the updated information of the social client is first notified to a specified category of associated clients and then is notified to other associated clients; in this way, it is ensured that some specified category of associated clients of the social client can be notified of information, thus effective synchronization of information of the social client is achieved and information processing efficiency of the social client is improved.

DETAILED DESCRIPTION

Figure 1:
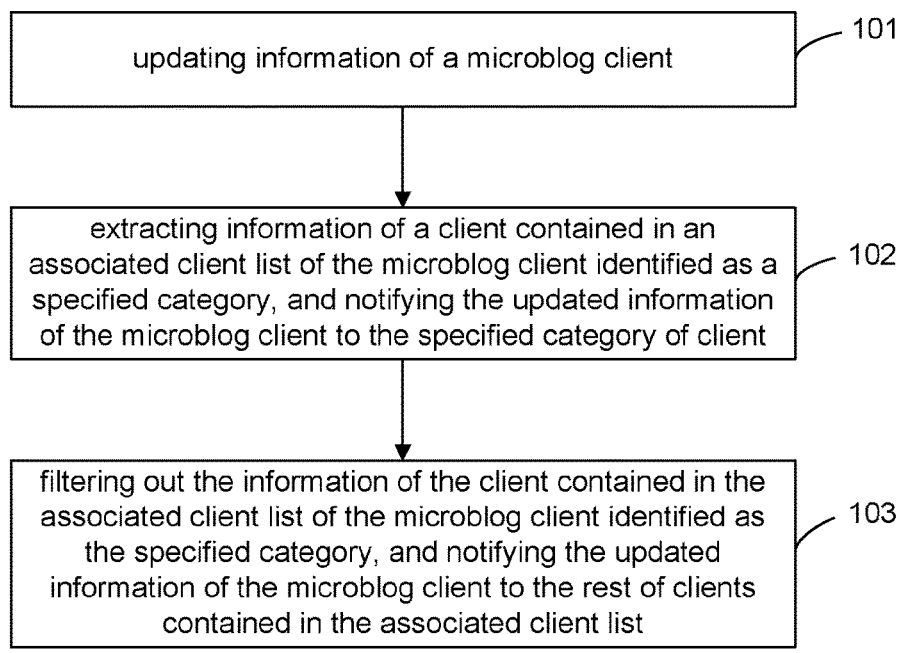
FIG. 1 shows a flowchart of a method for notifying information of a social client according to the present disclosure.

The method for notifying information of a microblog client according to the present disclosure, referred to FIG. 1, mainly includes the following steps:

Step 101: updating information of the microblog client.

Step 102: extracting information of a client contained in an associated client list of the microblog client identified as a specified category (hereinafter referred to as the client of the first category), and notifying the updated information of the microblog client to the specified category of client.

Specifically, an associated client list of the microblog client is pulled, from which the information of the client identified as the specified category can be acquired; and an associated client list of the specified category is established; then, based on the associated client list of the specified category, the updated information of the microblog client is notified to the specified category of clients.

The specified category of clients can refer to microblog clients with top priority (for example, VIP members). When it is necessary to propagate the updated information of a microblog client, clients of the specified category are notified first, and then clients of other categories are notified in order.

Here, before extracting the information of a client contained in the associated client list of the microblog client identified as a specified category, the method may further include: validating whether the microblog client is a client of the specified category; if so, extracting the information of the client contained in the associated client list of the microblog client identified as the specified category.

Here, if the microblog client is not a client of the specified client, the updated information of the microblog client is notified to the associated clients contained in the associated client list.

In practice, the identification of the client of the specified category and the identification of the associated client of the specified category can be preconfigured and designated; specifically, the two clients can be identified separately or uniformly. Generally, uniform identification is easy to operate, for example, the identification could adopt the identification of the client of the first category.

Step 103: filtering out the information of the client contained in the associated client list of the microblog client identified as the specified category, and notifying the updated information of the microblog client to the rest of clients contained in the associated client list.

Here, clients other than the clients of the specified category are called ordinary clients.

Correspondingly, notifying the updated information of the microblog client to the rest of clients contained in the associated client list specifically includes: notifying the updated information of the microblog client to part or all of the ordinary clients contained in the associated client list.

Here, the information of the microblog client might include user name, user status information, profile information, message count and the like of the microblog client.

Correspondingly, the present disclosure also provides a device for notifying information of a microblog client, including: an update unit and a notification unit, wherein the update unit is configured to update the information of the microblog and to trigger the notification unit; the notification unit is configured to extract information of a client contained in an associated client list of the microblog client identified as a specified category and to notify the updated information of the microblog client to the specified category of client, and to filter out the information of the client contained in the associated client list of the microblog client identified as the specified category and to notify the updated information of the microblog client to the rest of clients contained in the associated client list.

Here, the notification unit is specifically configured to acquire information of each of the associated clients of the microblog client identified as the specified category, to establish the associated client list of the specified category and to notify the updated information of the microblog client to the specified category of client according to the associated client list of the specified category.

The device can further include: a validation unit, configured to validate whether the microblog client is a client of the specified category; the notification unit is specifically configured to extract the information of the client contained in the associated client list of the microblog client identified as the specified category when the validation unit validates that the microblog client is a client of the specified category. In addition, the notification unit is further configured to notify the updated information of the microblog client to the associated clients contained in the associated client list when the validation unit validates that the microblog client is not a client of the specified category.

Here, the notification unit is specifically configured to notify the updated information of the microblog client to part or all of the associated clients contained in the associated client list.

In practice, the device for notifying the information of the microblog client can be a microblog server or set in the microblog server.

Hereinafter, by taking a microblog client having a huge number of associated clients for example (this microblog client belongs to the first category), the process of notifying the message count of the microblog client is further illustrated.

Figure 2:
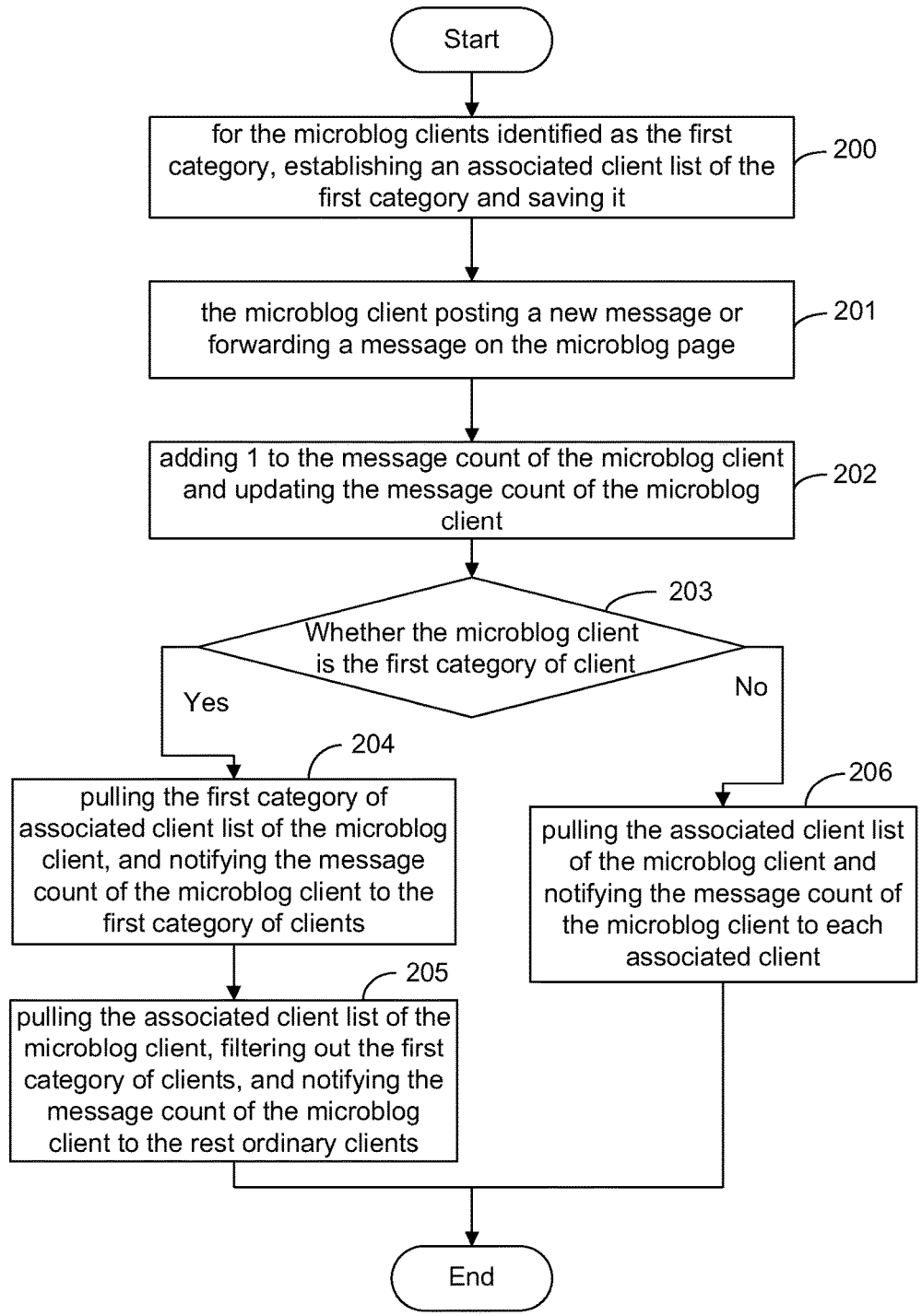
FIG. 2 shows a flowchart of notifying the message count of a social client in an embodiment of the present disclosure.

As shown in FIG. 2, the process of notifying the message count of a microblog client includes the following steps:

Step 200: the microblog server pulls an associated client list of the microblog client and extracts from this list the information of the clients identified as the first category, and establishes an associated client list of the first category and saves it.

Specifically, the associated client list might include associated client information, microblog page address or microblog page address link. The information of the microblog client might include user name, user status information, profile information, message count and the like of this client.

Here, the microblog server can query whether the information of certain associated client contained in the associated client list includes the first category identification; if so, it is determined that this associated client is the first category of client; otherwise, it is determined that this client is an ordinary client.

Step 201: the microblog client posts a new message or forwards a message on the microblog page by interacting with the microblog server.

Step 202: the microblog server adds 1 to the message count of the microblog client and updates the message count of the microblog client.

Step 203: the microblog server determines whether the microblog client is a client the first category; if so, Step 204 is executed; otherwise, Step 206 is executed.

Specifically, the microblog server determines whether the information of the microblog client includes the first category identification; if so, it is determined that the microblog client is the first category of client; otherwise, it is determined that the microblog client is an ordinary client.

Step 204: the microblog server pulls the first category of associated client list, and notifies the first category of clients of the message count of the microblog client.

Specifically, the microblog server pulls the first category of associated client list, acquires the microblog page address or microblog page address link of the first category of clients, and sends the message count of the microblog client to the first category of clients according to the microblog page address or microblog page address link of the first category of clients. Then, the first category of clients update the message count of the microblog client displayed on their own microblog pages.

Step 205: the microblog server pulls the associated client list of the microblog client, filters out the first category of clients contained in the list, and notifies the rest ordinary clients of the message count of the microblog client. Current process is ended.

Specifically, the microblog server pulls the associated client list of the microblog client, filters out the first category of clients contained in the list, acquires the microblog page address or microblog page address link of the ordinary associated clients contained in the list, and then sends the message count of the microblog client to each ordinary client according to the microblog page address or microblog page address link of each ordinary associated client; then, each ordinary client updates the message count of the microblog client displayed on its own microblog page.

In this step, the microblog serve also can extract part of the ordinary associated clients of the microblog client to notify, for example, extract the former 40,000 ordinary associated clients to notify based on the reverse order of join time.

Step 206: the microblog server pulls the associated client list of the microblog client and notifies the associated client of the message count of the microblog client. Current process is ended.

Specifically, the microblog server pulls the associated client list of the microblog client, acquires the microblog page address or microblog page address link of part or all associated clients contained in the list, and sends the message count of the microblog client to each associated client according to the microblog page address or microblog page address link of each associated client. Then, each associated client updates the message count of the microblog client displayed on its own microblog page.

In this step, the microblog server also can extract the former 40,000 associated clients of the microblog client to notify according to the reverse order of join time.

In an embodiment, for example, a first category of microblog client A has an associated client list (a, b, c, d, e), including five associated clients, namely, a, b, c, d and e, in which c and e are the first category of clients and have the first category identification, while a, b and d are ordinary clients and have no first category identification; thus, based on the first category identification, the information of the first category of clients (c, e) can be extracted from the associated client list of the first category of client A to consist a first category of client list (c, e). After the message count of the first category of client A is updated, the first category of clients (c, e) are notified first; then, the first category of clients (c, e) having the first category identification are filtered out from the associated client list (a, b, c, d, e), leaving an associated client list (a, b, d); finally, the associated clients (a, b, d) in the associated client list (a, b, d) are notified of the message count.

The above are the preferred embodiments of the disclosure only and are not intended to limit the scope of protection of the disclosure.

The invention claimed is:

1. A method for notifying information of a social client, the method comprising:
   acquiring a first associated client list of the social client, wherein the first associated client list includes associated client information, a microblog page address or a microblog page address link;
   extracting first information of associated clients that are identified in a specified category, from the first associated client list of the social client;
   establishing a second associated client list of the specified category, wherein the second associated client list includes the first information of the associated clients;
   updating second information of the social client, wherein the second information of the social client comprises any one or any combination of a user name, profile information, and a message count;
   in response to the second information of the social client being updated, validating whether the social client is one of the associated clients identified in the specified category;
   in response to the social client being validated to be the one of the associated clients identified in the specified category, notifying the updated second information of the social client to the associated clients;
   after the updated second information of the social client is notified to the associated clients identified in the specified category, filtering out the first information of the associated clients, from the first associated client list of the social client, and notifying the updated second information of the social client to remaining clients included in the first associated client list from which the first information of the associated clients is filtered out; and
   in response to the social client being validated to not be the one of the associated clients identified in the specified category, notifying the updated second information of the social client to one or more clients included in the first associated client list of the social client.

2. The method of claim 1, wherein the notifying the updated second information of the social client to the associated clients identified in the specified category comprises notifying the updated second information of the social client to part or all of the associated clients identified in the specified category.

3. A non-transitory computer-readable storage medium storing instructions that cause a processor to implement the method of claim 1.

4. A device for notifying information of a social client, the device comprising:
   at least one memory configured to store computer program code; and
   at least one processor configured to access the at least one memory and operate according to the computer program code, the computer program code comprising:
      notification code configured to cause the at least one processor to:
         acquire a first associated client list of the social client, wherein the first associated client list includes associated client information, a microblog page address or a microblog page address link;
         extract first information of associated clients that are identified in a specified category, from the first associated client list of the social client; and
         establish a second associated client list of the specified category, wherein the second associated client list includes the first information of the associated clients;
      update code configured to cause the at least one processor to update second information of the social client, wherein the second information of the social client comprises any one or any combination of a user name, profile information, and a message count;
      validation code configured to cause the at least one processor to, in response to the second information of the social client being updated, validate whether the social client is one of the associated clients identified in the specified category;
      wherein the notification code is further configured to cause the at least one processor to:
         in response to the social client being validated to be the one of the associated clients identified in the specified category, notify the updated second information of the social client to the associated clients;
         after the updated second information of the social client is notified to the associated clients identified in the specified category, filter out the first information of the associated clients, from the first associated client list of the social client, and notify the updated second information of the social client to remaining clients included in the first associated client list from which the first information of the associated clients is filtered out; and
         in response to the social client being validated to not be the one of the associated clients identified in the specified category, notifying the updated second information of the social client to one or more clients included in the first associated client list of the social client.

5. A server, comprising:
   at least one memory configured to store computer program code; and
   at least one processor configured to access the at least one memory and operate according to the computer program code, the computer program code comprising:
      notification code configured to cause the at least one processor to:
         acquire a first associated client list of a social client, wherein the first associated client list includes associated client information, a microblog page address or a microblog page address link;
         extract first information of associated clients that are identified in a specified category, from the first associated client list of the social client; and
         establish a second associated client list of the specified category, wherein the second associated client list includes the first information of the associated clients;
      validation code configured to cause the at least one processor to, in response to second information of the social client being updated, validate whether the social client is one of the associated clients identified in the specified category, wherein the second information of the social client comprises any one or any combination of a user name, profile information, and a message count;

wherein the notification code is further configured to cause the at least one processor to:
- in response to the social client being validated to be the one of the associated clients identified in the specified category, notify the updated second information of the social client to the associated clients;
- after the updated second information of the social client is notified to the associated clients identified in the specified category, filter out the first information of the associated clients, from the first associated client list of the social client, and notify the updated second information of the social client to remaining clients included in the first associated client list from which the first information of the associated clients is filtered out; and
- in response to the social client being validated to not be the one of the associated clients identified in the specified category, notifying the updated second information of the social client to one or more clients included in the first associated client list of the social client.

6. The server according to claim 5, wherein the notification code is further configured to cause the at least one processor to notify the updated second information of the social client to part or all of the associated clients identified in the specified category.

* * * * *